US012754540B2

(12) United States Patent
Shimizu et al.

(10) Patent No.: US 12,754,540 B2
(45) Date of Patent: Oct. 6, 2026

(54) SCADA WEB HMI CLIENT APPARATUS AND SCADA WEB HMI SYSTEM

(71) Applicant: TMEIC CORPORATION, Tokyo (JP)

(72) Inventors: Ryo Shimizu, Tokyo (JP); Akira Nojima, Tokyo (JP); Nobuo Shimizu, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 509 days.

(21) Appl. No.: 18/260,937

(22) PCT Filed: Dec. 27, 2021

(86) PCT No.: PCT/JP2021/048631
§ 371 (c)(1),
(2) Date: Jul. 11, 2023

(87) PCT Pub. No.: WO2023/127040
PCT Pub. Date: Jul. 6, 2023

(65) Prior Publication Data

US 2025/0076861 A1 Mar. 6, 2025

(51) Int. Cl.
*G05B 19/042* (2006.01)
*G05B 23/02* (2006.01)

(52) U.S. Cl.
CPC ......... *G05B 23/02* (2013.01); *G05B 19/0428* (2013.01); *G05B 2219/24215* (2013.01)

(58) Field of Classification Search
CPC ................ G05B 23/02; G05B 19/0428; G05B 2219/24215
See application file for complete search history.

(56) References Cited

U.S. PATENT DOCUMENTS 8,817,021 B1 * 8/2014 Hickman ................ G06T 15/00 345/426
2011/0046754 A1 * 2/2011 Bromley .......... G05B 19/41885 700/83
(Continued)

FOREIGN PATENT DOCUMENTS

CN 1783088 A 6/2006
CN 104508583 A 4/2015
(Continued)

OTHER PUBLICATIONS

International Search Report and Written Opinion mailed on Mar. 15, 2022, received for PCT Application PCT/JP2021/048631, Filed on Dec. 27, 2021, 8 pages.
(Continued)

*Primary Examiner* — Chris Parry
*Assistant Examiner* — Hassan Abdur-Rahman Khan
(74) *Attorney, Agent, or Firm* — XSENSUS LLP

(57) ABSTRACT

A SCADA web HMI client apparatus comprises a processor and a memory. The memory stores image data on an HMI screen to supervise an industrial plant, screen operation authority information, and exception information that are received from a web server. The screen operation authority information defines operation permission/prohibition of the HMI screen for each web browser. The exception information defines operation permission/prohibition of each of specific operation parts on the HMI screen for each web browser. The processor executes screen drawing processing in which operation permission/prohibition defined in the exception information is preferentially applied to each of the specific operation parts on the HMI screen, operation permission/prohibition defined in the screen operation authority information is applied to each of operation parts other than
(Continued)

the specific operation parts on the HMI screen, and the HMI screen is drawn on the web browser.

8 Claims, 7 Drawing Sheets

(56) References Cited

U.S. PATENT DOCUMENTS

| | | | | |
|---|---|---|---|---|
| 2011/0166677 | A1* | 7/2011 | Bromley | G05B 19/409 700/83 |
| 2013/0151998 | A1* | 6/2013 | Ookuma | G06F 3/0484 715/760 |
| 2014/0163698 | A1* | 6/2014 | Kato | H04L 12/403 700/7 |
| 2015/0177719 | A1* | 6/2015 | Wang | G06F 21/604 700/83 |
| 2017/0126843 | A1* | 5/2017 | Pantea | G06F 3/1454 |
| 2018/0059921 | A1* | 3/2018 | De Ligt | G05B 19/409 |
| 2018/0275858 | A1* | 9/2018 | Zhou | G05B 19/41875 |
| 2021/0208562 | A1* | 7/2021 | Fujieda | G09G 5/363 |
| 2021/0373546 | A1* | 12/2021 | Fujieda | G05B 23/0272 |
| 2022/0300084 | A1* | 9/2022 | Wachner | G06F 3/0482 |
| 2023/0280724 | A1* | 9/2023 | Shimizu | G05B 19/4185 700/9 |
| 2024/0201646 | A1* | 6/2024 | Shimizu | G05B 19/042 |

FOREIGN PATENT DOCUMENTS

| | | | | |
|---|---|---|---|---|
| JP | S63-44202 | A | 2/1988 | |
| JP | H04-5725 | A | 1/1992 | |
| JP | 2017-27211 | A | 2/2017 | |
| JP | 2019-114090 | A | 7/2019 | |
| JP | 2021115823 | A | 8/2021 | |
| TW | 201349133 | A | 12/2013 | |
| WO | WO-2020090033 | A1 * | 5/2020 | G05B 19/058 |
| WO | 2021/015022 | A1 | 1/2021 | |

OTHER PUBLICATIONS

Office Action mailed on Mar. 17, 2023, received for Taiwan Application 111127054, 19 pages including English Translation.

Office Action issued on Aug. 25, 2025, in corresponding Chinese patent Application No. 202180088412.3, 14 pages.

Office Action issued on Aug. 4, 2023, in corresponding Taiwanese patent Application No. 111127054, 10 pages.

Office Action issued on Aug. 1, 2023, in corresponding Taiwanese patent Application No. 111127054, 10 pages.

Office Action issued on Aug. 1, 2023, in corresponding Japanese patent Application No. 2023-511674, 2 pages.

Office Action dated Apr. 1, 2026 in the corresponding Indian patent application No. 202317043045, 7pp.

* cited by examiner

Fig.4

36a 36b

| BROWSER NAME / SCREEN NAME | RM1_1 | RM1_2 | FM1_1 | FM1_2 |
| --- | --- | --- | --- | --- |
| G10 | PERMITTED | PERMITTED | NOT PERMITTED | NOT PERMITTED |
| G11 | NOT PERMITTED | NOT PERMITTED | NOT PERMITTED | NOT PERMITTED |
| G12 | NOT PERMITTED | NOT PERMITTED | PERMITTED | PERMITTED |
| G13 | PERMITTED | PERMITTED | PERMITTED | PERMITTED |

27

Fig.5

36a 36b

| SCREEN NAME | PARTS NAME | BROWSER NAME | |
|---|---|---|---|
| | | RM1_1 | FM1_1 |
| G11 | 1_PL | PERMITTED | NOT PERMITTED |
| G11 | 2_PL | PERMITTED | PERMITTED |
| G11 | 3_PL | NOT PERMITTED | PERMITTED |

28

SCADA WEB HMI CLIENT APPARATUS AND SCADA WEB HMI SYSTEM

CROSS-REFERENCE TO RELATED APPLICATION

The present application is based on PCT filing PCT/JP2021/048631, filed Dec. 27, 2021, the entire contents of which are incorporated herein by reference.

FIELD

The present disclosure relates to a SCADA web HMI client apparatus and a SCADA web HMI system.

BACKGROUND

A SCADA (Supervisory Control And Data Acquisition) is known as a mechanism supervising and controlling social infrastructure systems. The social infrastructure systems include a steel rolling system, a power transmission and transformation system, a water and sewage treatment system, a building management system, a road system, and the like.

The SCADA is a type of industrial control system, and performs system supervision, process control, and data collection by a computer. The SCADA requires quick responsiveness (real-time property) corresponding to processing performance of the system.

The SCADA generally includes the following sub-systems.

(1) HMI (Human Machine Interface)

An HMI is a mechanism that presents data on a supervisory object apparatus to an operator, and enables the operator to supervise and control the supervisory object apparatus.

(2) Supervisory Control System

A supervisory control system includes a Programmable Logic Controller (PLC) and the like. The supervisory control system collects data on the supervisory object apparatus, and transmits a control command to the supervisory object apparatus.

(3) Remote Input/Output Apparatus (Remote Input Output: RIO)

A remote input/output apparatus is connected to a sensor installed in the supervisory object apparatus, converts a signal of the sensor into digital data, and transmits the digital data to the supervisory control system.

(4) Communication Base

A communication base connects the supervisory control system and the remote input/output apparatus.

As an example of the SCADA HMI sub-systems, PTL 1 discloses a system comprising an HMI client apparatus and an HMI server apparatus. In the existing SCADA disclosed in PTL 1, the HMI server apparatus transmits data received from the PLC to the HMI client apparatus. The HMI client apparatus includes a computer main body, input devices such as a keyboard and a mouse, and a monitor. The HMI client apparatus displays one HMI screen on the monitor.

Note that the applicant is aware of the following literatures including the above-described literature, as literatures related to the present disclosure.

CITATION LIST

Patent Literature

[PTL 1] JP 2017-27211 A
[PTL 2] JP 2019-114090 A

SUMMARY

Technical Problem

In the HMI sub-system according to PTL 1 described above, one HMI client apparatus is necessary to display one HMI screen. In terms of reduction in cost, installation space, failure rate, and communication load, it is desirable to simultaneously use a plurality of HMI screens by one HMI client apparatus.

As a result of study and research, the inventor of the present application has developed a browser-based SCADA HMI sub-system. This makes it possible to realize an HMI screen as a web application operating on a web browser. Accordingly, a plurality of web browsers can be executed on one HMI client apparatus, and the HMI screen can be displayed on each of the web browsers.

Application of such a browser-based SCADA HMI sub-system to a production line of an industrial system is studied. A large-scale plant such as the production line of the industrial system is divided into a plurality of sections, and each of the sections includes an operation room (pulpit). An HMI client apparatus that executes the web browser drawing the HMI screen is disposed in each of the operation rooms. An HMI server apparatus that executes a web server communicating with each of the web browsers is disposed in an electric room.

On the web browser of the HMI client apparatus in a first section, a dedicated HMI screen relating to facilities of the first section should be operable. And, on the web browser of the HMI client apparatus in a second section, a dedicated HMI screen relating to facilities of the second section should be operable. In other words, operation authority in an HMI screen unit is basically set to each of the web browsers. This is because there are several thousands of operation signals in the large-scale plant, and it is not possible to manage the operation authority in an operation part unit on the HMI screen.

However, there is a case where an intermediate facility is provided between the first section and the second section. In such a case, a common HMI screen common to a delivery-side facility of the first section, the intermediate facility, and an entry-side facility of the second section is necessary. The common HMI screen is used by the HMI client apparatus in the first section and by the HMI client apparatus in the second section.

In this case, an operation part relating to the facility of the first section on the common HMI screen can be operated from the first section, but an operation part relating to the facility of the second section must not be operated from the first section. In contrast, the operation part relating to the facility of the second section on the common HMI screen can be operated from the second section, but the operation part relating to the facility of the first section must not be operated from the second section. An operation part relating to the intermediate facility may be operated from both of the sections. Accordingly, as for the common HMI screen, definition of the operation authority in the HMI screen unit is insufficient, and it is necessary to impart appropriate operation authority in an operation part unit.

The present invention is to solve the above-described issues, and an object of the present invention is to provide a SCADA web HMI client apparatus and a SCADA web HMI system in which operation authority in an HMI screen unit can be set to each of web browsers in principle, and operation authority of a specific operation part on the HMI screen can be exceptionally set to each of the web browsers in an operation part unit.

A first aspect relates to a SCADA web HMI client apparatus.

The SCADA web HMI client apparatus executes at least one web browser communicating with a web server.

The SCADA web HMI client apparatus comprises a processor, a memory, and a monitor.

The memory stores image data on an HMI screen to supervise an industrial plant, screen operation authority information, and exception information that are received from the web server. Here, the screen operation authority information defines operation permission/prohibition of the HMI screen for each web browser. The exception information defines operation permission/prohibition of each of specific operation parts on the HMI screen for each web browser. The specific operation parts are a part of a plurality of operation parts on the HMI screen.

The processor is configured to execute the web browser displayed on the monitor and to execute screen drawing processing.

In the screen drawing processing, operation permission/prohibition defined in the exception information is preferentially applied to each of the specific operation parts on the HMI screen, operation permission/prohibition (non-permission) defined in the screen operation authority information is applied to each of operation parts other than the specific operation parts on the HMI screen, and the HMI screen is drawn on the web browser.

A second aspect relates to a SCADA web HMI system.

The SCADA web HMI system comprises an HMI server apparatus configured to execute a web server; and an HMI client apparatus configured to execute at least one web browser communicating with the web server.

The HMI server apparatus includes a server processor and a server memory.

The server memory stores: image data on an HMI screen to supervise an industrial plant; screen operation authority information; and exception information. Here, the screen operation authority information defines operation permission/prohibition (non-permission) of the HMI screen for each web browser. The exception information defines operation permission/prohibition (non-permission) of each of specific operation parts on the HMI screen for each web browser. The specific operation parts are a part of a plurality of operation parts on the HMI screen.

The server processor is configured to execute the web server, the web server being capable of transmitting the image data, the screen operation authority information, and the exception information to the web browser.

The HMI client apparatus includes a client processor, a client memory, and a monitor.

The client memory stores the image data, the screen operation authority information, and the exception information received from the web server.

The client processor is configurated to execute the web browser displayed on the monitor and to execute screen drawing processing.

In the screen drawing processing, operation permission/prohibition defined in the exception information is preferentially applied to each of the specific operation parts on the HMI screen, operation permission/prohibition defined in the screen operation authority information is applied to each of operation parts other than the specific operation parts among the plurality of operation parts on the HMI screen, and the HMI screen is drawn on the web browser.

Advantageous Effects of Invention

According to the present disclosure, it is possible to set the operation authority to each of the web browsers in the HMI screen unit in principle. As an exception, the operation authority of the specific operation part(s) on the HMI screen can be set to each of the web browsers in the operation part unit. Accordingly, it is possible to efficiently manage the operation authority of each of the web browsers in the HMI screen unit, and to exceptionally manage the operation authority of each of the web browsers in the operation part unit as necessary.

BRIEF DESCRIPTION OF DRAWINGS

FIG. 4 is a diagram illustrating an example of an operation authority table according to the embodiment.

FIG. 5 is a diagram illustrating an example of an exception table according to the embodiment.

DESCRIPTION OF EMBODIMENTS

Figure 1:
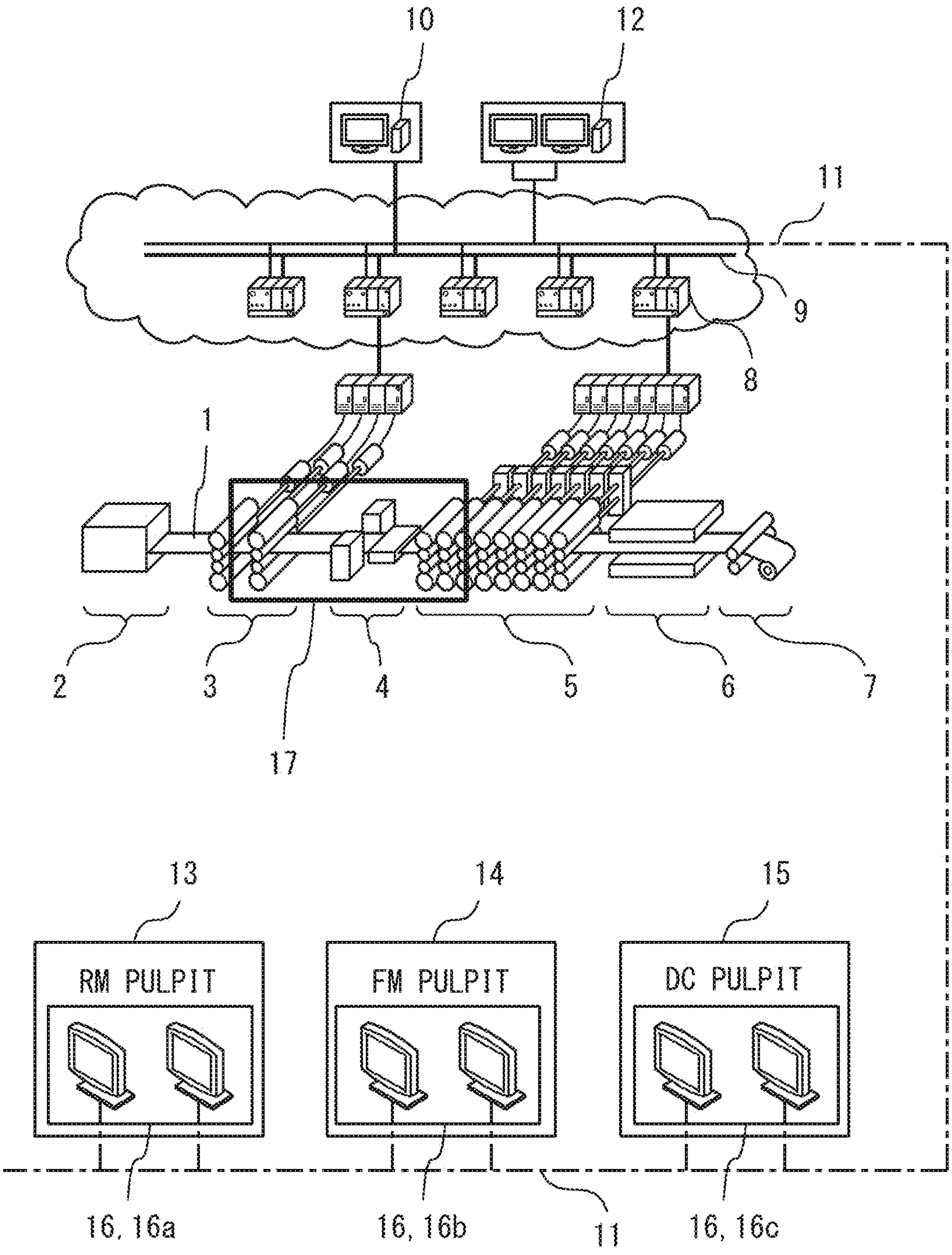
FIG. 1 is a diagram to explain a configuration example of a hot rolling line according to an embodiment.

An embodiment of the present invention is described in detail below with reference to drawings. Note that elements common to the drawings are denoted by the same reference numerals, and repetitive descriptions are omitted.

Embodiment

1. Production Line of Industrial System

An example of a production line of an industrial system that is an application target of a SCADA web HMI system is described with reference to FIG. 1. FIG. 1 is a diagram to explain a configuration example of a hot rolling line according to the embodiment.

A metal material to be rolled 1 is rolled while being processed by the hot rolling line, and a size and a temperature of the material are controlled to respective desired target values. The hot rolling line includes a heating furnace 2, a roughing mill 3, an intermediate facility 4, a finishing mill 5, a water-cooling apparatus 6, a coiler 7, and a roller table (not illustrated) conveying the material to be rolled 1 among these apparatuses.

The heating furnace 2 increases the temperature of the material to be rolled 1. The material to be rolled 1 increased in temperature is extracted onto the roller table. When delivered from the heating furnace 2, the material to be rolled 1 is a shaped metal block called a slab.

The roughing mill 3 is provided on a downstream of the heating furnace 2. The roughing mill 3 includes a single rolling stand or a plurality of rolling stands. The roughing mill 3 rolls the material to be rolled 1 a plurality of times in a forward direction (from upstream toward downstream) and an opposite direction (from downstream toward upstream).

The intermediate facility 4 is provided on the downstream of the roughing mill 3. The intermediate facility 4 includes an edge heater, a bar heater, a coil box, and the like.

The finishing mill 5 is provided on the downstream of the intermediate facility 4. The finishing mill 5 includes a plurality of rolling stands, and rolls the material to be rolled 1 in one direction from the upstream toward the downstream. Final quality of the material to be rolled 1 relating to the size such as a plate thickness and a plate width is determined by the finishing rolling.

The water-cooling apparatus 6 is provided on the downstream of the finishing mill 5. The water-cooling apparatus 6 injects water to the rolled material to be rolled 1. The material to be rolled 1 is cooled to a target temperature by the water-cooling apparatus 6.

The coiler 7 is provided on the downstream of the water-cooling apparatus 6. The material to be rolled 1 cooled by the water-cooling apparatus 6 is coiled by the coiler 7 while being guided downward by a pinch roll, and thereby turning into a coil-shaped product.

The above-described apparatuses (2 to 7) are connected to a PLC 8 through an electric motor and a drive apparatus. The PLC 8 is connected to a computer 10 disposed in a computer room through a control LAN 9. The computer 10 calculates setting values of the respective apparatuses (2 to 7) based on a rolling plan for the material to be rolled 1, and transmits the setting values to the PLC 8. The PLC 8 controls the apparatuses (2 to 7) based on the respective setting values.

Further, the PLC 8 is connected to an HMI server apparatus 12 disposed in an electric room through an information LAN 11 such as Ethernet®. The PLC 8 periodically transmits a packet including block data to the information LAN 11 by multicast or broadcast. The block data is a set of PLC signals. One piece of block data includes several tens to several hundred PLC signals. The PLC signals include input/output signals (including actuator control signals and sensor detection signals) and alarm signals. Further, the PLC 8 receives control signals for the apparatuses from the HMI server apparatus 12.

A large-scale plant such as the above-described hot rolling line is divided into a plurality of sections. Each of the sections includes an operation room (pulpit). An RM (Roughing Mills) pulpit 13 is an operation room for a section including the roughing mill 3. An FM (Finishing Mills) pulpit 14 is an operation room for a section including the finishing mill 5. A DC (Down Coiler) pulpit 15 is an operation room for a section including the coiler 7.

Each of the operation rooms includes an HMI client apparatus 16 in which an HMI screen is operable on a web browser. On a web browser of an HMI client apparatus 16*a* in the RM pulpit 13, a dedicated HMI screen for the roughing mill 3 can be operated. On a web browser of an HMI client apparatus 16*b* in the FM pulpit 14, a dedicated HMI screen for the finishing mill 5 can be operated. On a web browser of an HMI client apparatus 16*c* in the DC pulpit 15, a dedicated HMI screen for the coiler 7 can be operated. In other words, operation authority in an HMI screen unit is basically set to each of the web browsers. This is because there are several thousands of operation signals in the large-scale plant, and it is not possible to manage the operation authority in an operation part unit on the HMI screen. Note that, in the present specification, in a case where the HMI client apparatuses (16*a*, 16*b*, and 16*c*) are not distinguished from one another, each of the HMI client apparatuses is simply referred to as the HMI client apparatus 16.

The intermediate facility 4 is provide between the roughing mill 3 and the finishing mill 5. In such a case, a common HMI screen 17 as exemplified in FIG. 2 common to a delivery-side facility of the roughing mill 3, the intermediate facility 4, and an entry-side facility of the finishing mill 5 is necessary. The common HMI screen 17 is used in the RM pulpit 13 and the FM pulpit 14.

In this case, an operation part 18 for the roughing mill 3 on the common HMI screen 17 can be operated from the RM pulpit 13, but an operation part 19 for the finishing mill 5 must not be operated from the RM pulpit 13. In contrast, the operation part 19 for the finishing mill 5 on the common HMI screen 17 can be operated from the FM pulpit 14, but the operation part 18 for the roughing mill 3 must not be operated from the FM pulpit 14. An operation part 20 for the intermediate facility 4 may be operated from both pulpits. For example, a coil box as the intermediate facility 4 is operated for coiling from the RM pulpit 13, and is operated for payout from the FM pulpit 14. Therefore, as for the common HMI screen 17, definition of operation authority in the HMI screen unit is insufficient, and it is necessary to impart appropriate operation authority in the operation part unit.

Thus, in the SCADA web HMI system according to the present embodiment, operation authority in the HMI screen unit can be set to each of the web browsers in principle, and operation authority of a specific operation part on the HMI screen can be exceptionally set to each of the web browsers in the operation part unit.

2. SCADA Web HMI System

The SCADA web HMI system according to the present embodiment is described with reference to FIG. 3 to FIG. 5. The SCADA web HMI system includes the HMI server apparatus 12 and the HMI client apparatuses 16 mutually connected through the information LAN 11.

2-1. Configuration of HMI Server Apparatus

Figure 3:
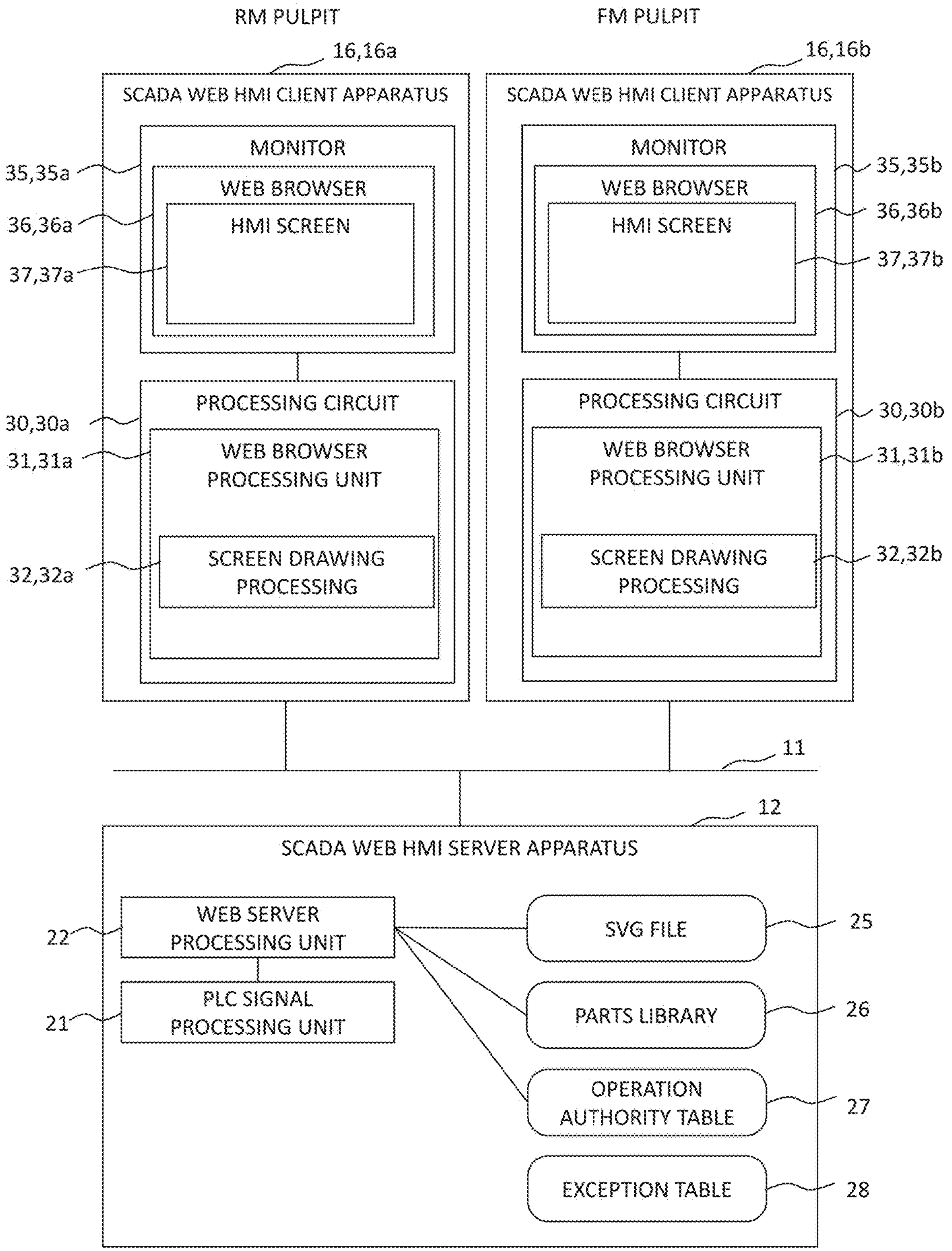
FIG. 3 is a block diagram illustrating overview of the functions held by an HMI server apparatus and an HMI client apparatus according to the embodiment.
Figure 7:
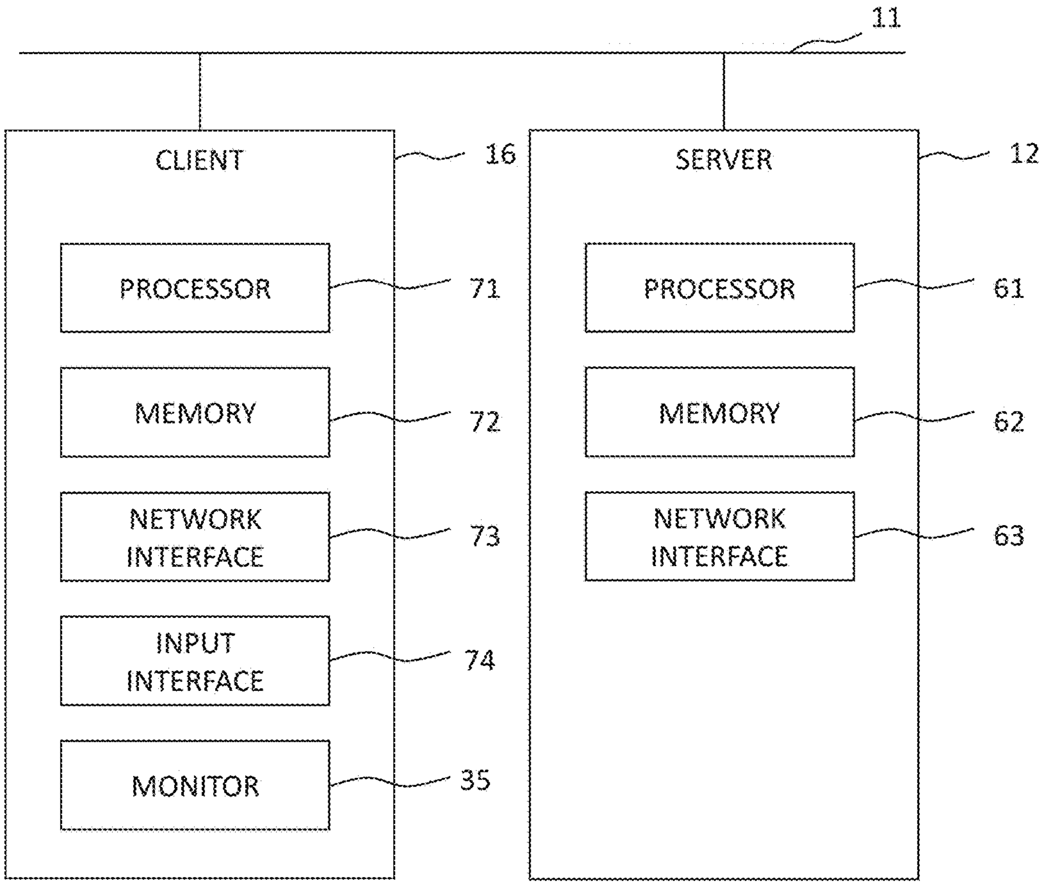
FIG. 7 is a block diagram illustrating a hardware configuration example of a SCADA web HMI system according to the embodiment.

The HMI server apparatus 12 illustrated in FIG. 3 transmits and receives PLC signals and control signals to/from the PLC 8, and executes the web server. As illustrated in FIG. 7 described below, the HMI server apparatus 12 includes a processor 61 performing various kinds of processing, and a memory 62 storing various kinds of information. The processor 61 functions as a PLC signal processing unit 21 and a web server processing unit 22 by executing programs stored in the memory 62. The PLC signal processing unit 21 and the web server processing unit 22 can mutually transmit and receive data through inter-process communication.

The PLC signal processing unit 21 transmits the PLC signals periodically received from the PLC 8, to each of web browsers 36 (each of web browser processing units 31) through the web server processing unit 22. Further, the PLC signal processing unit 21 transmits the control signals received from the web browsers 36 through the web server processing unit 22, to the PLC 8.

The web server processing unit 22 can communicate with the web browsers 36 (web browser processing units 31) of the respective HMI client apparatuses 16 by using HTTP (Hypertext Transfer Protocol), HTTPS (Hypertext Transfer Protocol Secure), and WebSocket. The web server processing unit 22 transmits contents in response to a request from each of the web browsers 36 (each of web browser processing units 31). The contents include an HTML file (not illustrated), an SVG (Scalable Vector Graphics) file 25 that is image data for each HMI screen (HMI Screen), a parts library 26 in which operation for each type of part is described, an operation authority table 27, and an exception table 28.

The parts library 26 includes a set of scripts in which operation for each type of part is described. Each of the scripts is a JavaScript® program defined for each type of part. Each of the scripts is given a parameter value (for example, presence/absence of operation authority defined in operation authority table 27 and exception table 28) as necessary, and can be executed on each of the web browsers 36.

The operation authority table 27 includes screen operation authority information defining operation permission/prohibition (whether operation authority is given (whether operation is permitted) and whether operation authority is not given (whether operation is not permitted)) of each of HMI screens 37 of the web browsers 36.

FIG. 4 is a diagram illustrating an example of the operation authority table 27. "G10" to "G13" are screen names of the respective HMI screens 37. "RM1_1" is a browser name of a first web browser 36*a* executed by the HMI client apparatus 16*a*. "RM1_2" is a browser name of a second web browser (not illustrated) executed by the HMI client apparatus 16*a*. "FM1_1" is a browser name of a first web browser 36*b* executed by the HMI client apparatus 16*b*, and "FM1_2" is a browser name of a second web browser (not illustrated) executed by the HMI client apparatus 16*b*. As an example, each browser name is a name obtained by combining a parts name of a computer and a monitor number. In the example illustrated in FIG. 4, the web browser 36*a* (RM1_1) has operation authority of an HMI screen 37*a* (G10), and the web browser 36*b* (FM1_1) does not have operation authority of an HMI screen 37*b* (G10).

As described above, the operation authority is set in the HMI screen unit as defined in the operation authority table 27 in principle. However, as for the specific HMI screen (common HMI screen 17 (FIG. 1 and FIG. 2)), it is necessary to exceptionally set the operation authority in the operation part unit. The exception table 28 includes exception information defining operation permission/prohibition (whether operation authority is given (whether operation is permitted) and whether operation authority is not given (whether operation is not permitted)) of each of specific operation parts on each of the HMI screens 37 of the web browsers 36. The specific operation parts are a part of a plurality of operation parts on each of the HMI screens 37.

FIG. 5 is a diagram illustrating an example of the exception table 28. "G11" is a screen name of the common HMI screen 17 (FIG. 2) that is one of the HMI screens 37. In the operation authority table 27 (FIG. 4), none of the web browsers 36 have operation authority of the common HMI screen 17 (G11). However, operation authority of specific operation parts (1_PL, 2_PL, and 3_PL) on the common HMI screen 17 (G11) is set in the operation part unit in the exception table 28. The web browser 36*a* (RM1_1) has operation authority of the operation parts 18 (1_PL) and 19 (3_PL), but does not have operation authority of the operation part 20 (2_PL). The web browser 36*b* (FM1_1) has operation authority of the operation parts 20 (2_PL) and 19 (3_PL), but does not have operation authority of the operation part 18 (1_PL).

In other words, in the exception table 28, it is defined that only the operation part 18 (1_PL) for the roughing mill 3 and the operation part 20 (2_PL) for the intermediate facility 4 are operable from the web browser 36*a* (RM1_1) in the RM pulpit, and only the operation part 19 (3_PL) for the finishing mill 5 and the operation part 20 (2_PL) for the intermediate facility 4 are operable from the web browser 36*b* (FM1_1) in the FM pulpit. Note that operation authority of the operation part not defined (including blank) in the exception table 28 follows definition in the operation authority table 27.

2-2. Configuration of HMI Client Apparatus

Referring back to FIG. 3, the description is continued. Each HMI client apparatus 16 (16*a* or 16*b*) includes a processing circuit 30 (30*a* or 30*b*) and a monitor 35 (35*a* or 35*b*). The processing circuit 30 (30*a* or 30*b*) includes a processor 71 performing various kinds of processing and a memory 72 storing various kinds of information illustrated in FIG. 7 described below. The processor 71 functions as the web browser processing unit 31 (31*a* or 31*b*) by executing programs stored in the memory 72. Note that, in the present specification, in a case where reference numerals 30*a* to 37*a* and reference numerals 30*b* to 37*b* are not distinguished from each other, the reference numerals 30 to 37 are simply used.

The web browser processing units 31 are performed by the respective web browsers 36. Each of the web browsers 36 draws the HMI screen 37 to supervise and control the industrial plant. The HMI screen 37 is switched to another HMI screen 37 by operation by an operator. A plurality of parts are arranged in the HMI screen 37. The parts include, for example, operation parts to transmit the control signal to the PLC 8 in response to operation by the operator, display parts changed in display state (numerical value, characters, color, and shape) in response to the received PLC signal, and screen transition parts to switch the HMI screen to another HMI screen.

At startup, each of the web browsers 36 (each of web browser processing units 31) receives the HTML file, the SVG file 25, the parts library 26, the operation authority table 27, the exception table 28, and the like described above from the web server processing unit 22, and stores these data in the memory 72. Each of the web browsers 36 draws the HMI screen 37 in which the parts are arranged, based on these data. Further, at startup, each of the web browsers 36 is executed in a mode not using a cache in order to constantly acquire latest files from the web server processing unit 22.

Each of the web browser processing units 31 reads the operation authority table 27 received from the HMI server apparatus 12, and determines operation permission/prohibition (non-permission) (presence/absence of operation authority) of each of the HMI screens 37 of the respective web browsers 36. Further, each of the web browser processing units 31 reads the exception table 28 received from the HMI server apparatus 12, and determines operation permission/prohibition (non-permission) of each of specific operation buttons on the HMI screen 37 (common HMI screen 17) of the corresponding web browser 36.

Further, each of the web browser processing units 31 performs screen drawing processing 32. In the screen drawing processing 32, operation permission/prohibition (non-permission) determined in the exception table 28 is preferentially applied to each of the specific operation parts in the HMI screen 37, operation permission/prohibition (non-permission) defined in the operation authority table 27 is applied to each of operation parts other than the specific operation parts among the plurality of operation parts in the HMI screen 37, and the HMI screen 37 is then drawn on each of the web browsers 36.

More specifically, the web browser processing unit 31 executes the script for each type of part included in the above-described parts library 26, based on the type of each of the parts arranged in the HMI screen 37. Here, among the types of part, operation parts changed in operation based on presence/absence of the operation authority (parameter value) passed to the script are described.

In a case where the web browser 36 is not permitted to operate the HMI screen 37 in the operation authority table 27, all of the operation parts arranged in the HMI screen 37 of the web browser 36 are drawn in an inoperable state in principle. In a case where the web browser 36 is permitted to operate the HMI screen 37 in the operation authority table 27, all of the operation parts arranged in the HMI screen 37 of the web browser 36 are drawn in an operable state in principle.

As an exception, in a case where operation authority of each of the specific operation parts in the specific HMI screen 37 (common HMI screen 17) is defined in the exception table 28, the operation authority defined in the exception table 28 is preferentially applied to each of the specific operation parts. As for each of the operation parts not defined in the exception table 28, operation authority defined in the operation authority table 27 is applied.

In the inoperable state, each of the operation parts does not accept execution operation (for example, mouse click) by the operator. In the operable state, each of the operation parts accepts the execution operation by the operator, and transmits a control signal corresponding to the operation to the HMI server apparatus 12.

3. Example of Processing by HMI Client Apparatus

Figure 6:
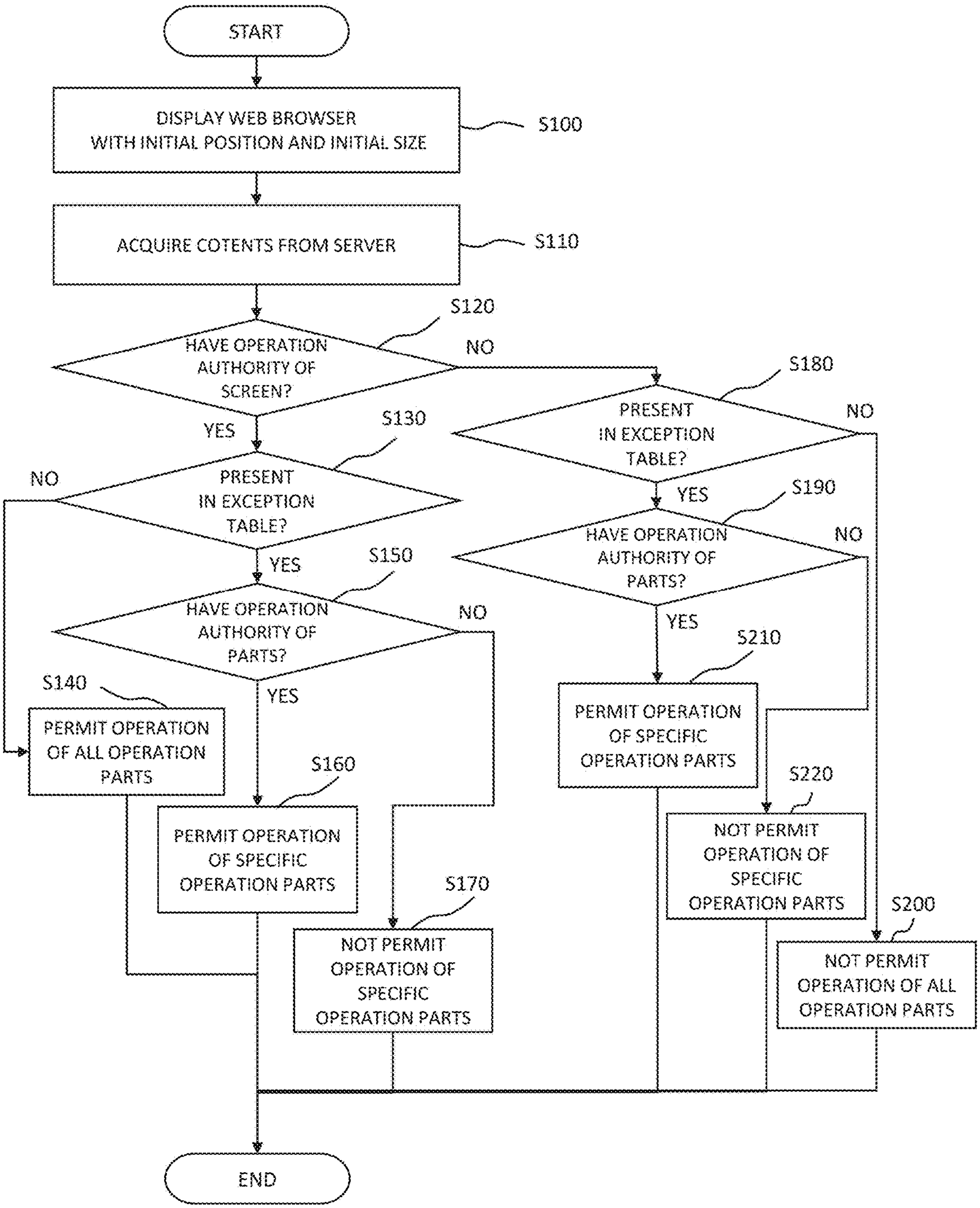
FIG. 6 is a flowchart to explain a screen drawing processing according to the embodiment.

Drawing of the HMI screen 37 on each of the web browsers 36 based on presence/absence of operation authority is specifically described with reference to FIG. 4 to FIG. 6. FIG. 4 is a diagram illustrating an example of the above-described operation authority table 27. FIG. 5 is a diagram illustrating an example of the above-described exception table 28. FIG. 6 is a flowchart to explain an example of processing by each HMI client apparatus 16.

In step S100 in FIG. 6, the HMI client apparatus 16 executes the web browser 36. The web browser processing unit 31 displays the web browser 36 with an initial size at a predetermined initial position on the predetermined monitor 35 irrespective of a position and a size when the web browser 36 is ended.

In step S110, the web browser 36 acquires contents from the HMI server apparatus 12. The contents include the HTML file, the SVG file 25, the parts library 26, the operation authority table 27, and the exception table 28 described above. Note that it is sufficient to acquire the parts library 26, the operation authority table 27, and the exception table 28 only at startup of the web browser 36.

In steps S120 to S220, the web browser processing unit 31 draws the designated HMI screen 37 on the web browser 36 based on the operation authority table 27 and the exception table 28.

The web browser processing unit 31 determines whether the web browser 36 has operation authority of the HMI screen 37, with reference to the operation authority table 27 (step S120). In a case where the web browser 36 has the operation authority, it is determined whether exception information on the HMI screen 37 is present in the exception table 28 (step S130). In a case where no exception information is present, the web browser processing unit 31 draws all of the operation parts in the HMI screen 37 in the operable state (step S140).

As an example of step S140, an example in which the HMI screen 37*a* (G10) is displayed on the web browser 36*a* (RM1_1) is described. In the operation authority table 27 in FIG. 4, the web browser 36*a* (RM1_1) is permitted to operate the HMI screen 37*a* (G10) (operation authority is given). Further, in the exception table 28 in FIG. 5, no exception information on the HMI screen 37*a* (G10) is present. Therefore, all of the operation buttons of the HMI screen 37*a* (G10) are drawn in the operable state on the web browser 36*a* (RM1_1).

In contrast, in a case where it is determined in step S130 that the exception information on the HMI screen 37 is present in the exception table 28, processing in step S150 is performed. In step S150, the web browser processing unit 31 determines operation permission/prohibition of each of the specific operation parts on the HMI screen 37. Each of the specific operation parts, operation of which is permitted, is drawn in the operable state (step S160). In contrast, each of the specific operation parts, operation of which is not permitted, is drawn in the inoperable state (step S170). Note that each of the operation parts not defined in the exception table 28 is drawn in the operable state based on definition in the operation authority table 27.

Referring back to step S120 in FIG. 6, the description is continued. In a case where it is determined in step S120 that the web browser 36 does not have the operation authority of the HMI screen 37, processing in step S180 is performed. In step $180, it is determined whether the exception information on the HMI screen 37 is present in the exception table 28. In a case where no exception information is present, the web browser processing unit 31 draws all of the operation parts on the HMI screen 37 in the inoperable state (step S200).

As an example of step S200, an example in which the HMI screen 37*a* (G12) is displayed on the web browser 36*a* (RM1_1) is described. In the operation authority table 27 in FIG. 4, the web browser 36*a* (RM1_1) is not permitted to operate the HMI screen 37*a* (G12) (operation authority is not given). Therefore, all of the operation buttons on the HMI screen 37*a* (G12) are drawn in the inoperable state on the web browser 36*a* (RM1_1).

In contrast, in a case where it is determined in step S180 that the exception information on the HMI screen 37 is present in the exception table 28, processing in step S190 is performed. In step S190, the web browser processing unit 31 determines operation permission/prohibition (non-permission) of each of the specific operation parts on the HMI screen 37. Each of the specific operation parts, operation of which is permitted, is drawn in the operable state (step S210). In contrast, each of the specific operation parts, operation of which is not permitted, is drawn in the inoperable state (step S220). Note that each of the operation parts not defined in the exception table 28 is drawn in the inoperable state based on definition in the operation authority table 27.

Figure 2:
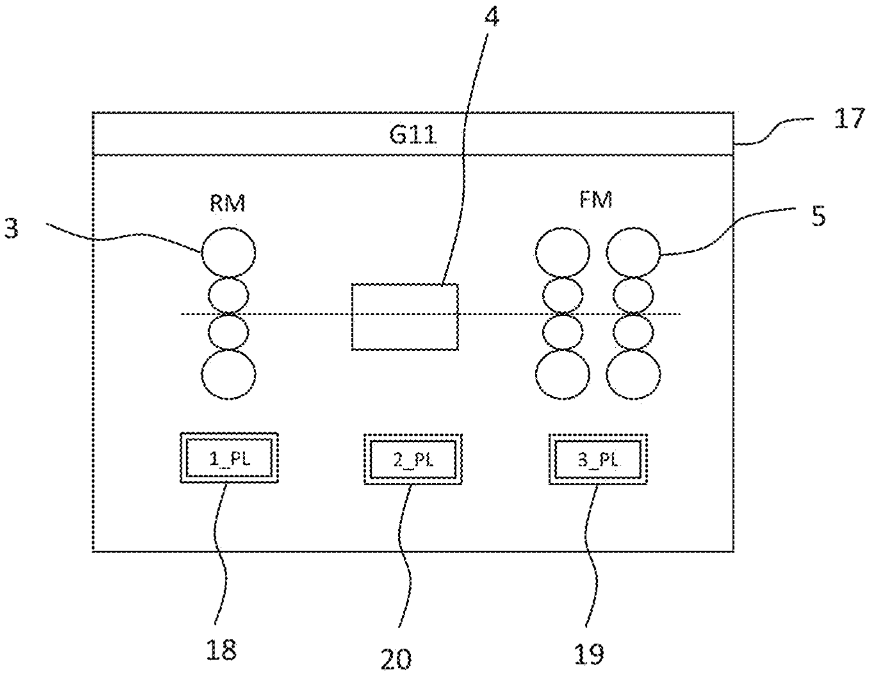
FIG. 2 is a diagram to explain an example of a common HMI screen according to the embodiment.

For example, in the operation authority table 27 in FIG. 4, the web browser 36*a* (RM1_1) is not permitted to operate the common HMI screen 17 (G11) in FIG. 2 (operation authority is not given); however, the exception information on the common HMI screen 17 (G11) is defined in the exception table 28 in FIG. 5. Therefore, the exception information is preferentially applied. In the exception table 28 in FIG. 5, operation of the specific operation parts (1_PL and 2_PL) on the common HMI screen 17 (G11) is permitted (operation authority is given). Therefore, the specific operation parts (1_PL and 2_PL) on the common HMI screen 17 (G11) are drawn in the operable state on the web browser 36*a*, and the other operation parts (including 3_PL) are drawn in the inoperable state.

As described above, in the case where the web browser 36 is permitted to operate the HMI screen 37 in the operation authority table 27 and the web browser 36 is not permitted to operate the specific operation parts on the HMI screen 37 in the exception table 28, the web browser processing unit 31 draws the specific operation parts in the inoperable state on the web browser 36, and draws the operation parts other than the specific operation parts in the operable state on the web browser 36.

Further, in a case where the web browser 36 is not permitted to operate the HMI screen 37 in the operation authority table 27 and where the web browser 36 is permitted to operate the specific operation parts on the HMI screen 37 in the exception table 28, the web browser processing unit 31 draws the specific operation parts in the operable state on the web browser 36, and draws the operation parts other than the specific operation parts in the inoperable state on the web browser 36.

In the above-described flowchart in FIG. 6, drawing of the HMI screen 37 at startup of the web browser 36 is described. However, the screen may be transited to another HMI screen 37 in response to pressing of a screen transition button. In this case, the web browser processing unit 31 newly acquires the HTML file and the SVG file 25 relating to the another HMI screen 37 from the HMI server apparatus 12, and performs processing in and after step S120.

4. Effects

As described above, in the SCADA web HMI system according to the present embodiment, the operation authority in the HMI screen unit can be set to each of the web browsers in principle. Accordingly, when the dedicated HMI screen is created for each of the sections and operation authority of the dedicated HMI screen is set to the web browser of each of the sections, it is possible to efficiently manage the operation authority of several thousands of operation signals in the large-scale plant, in the of HMI screen unit.

Further, operation authority of the specific operation parts on the HMI screen can be exceptionally set to each of the web browsers 36 in the operation part unit. Accordingly, in a case where the same HMI screen is displayed on the web browser of a first section and the web browser of a second section, different operation authority of the specific operation parts can be set to the web browser of the first section and the web browser of the second section. Accordingly, one HMI screen can be shared with appropriate operation authority corresponding to each of the sections.

5. Hardware Configuration Example

FIG. 7 is a block diagram illustrating a hardware configuration example of the HMI server apparatus 12 and each HMI client apparatus 16.

The processing of the above-described HMI server apparatus 12 is realized by a processing circuit. The processing circuit includes the processor 61, the memory 62, and a network interface 63 that are connected to one another. The processor 61 realizes the functions of the HMI server apparatus 12 by executing various kinds of programs stored in the memory 62. The memory 62 includes a main storage device and an auxiliary storage device. The memory 62 previously stores the HTML file, the SVG file 25, the parts library 26, the operation authority table 27, and the exception table 28 described above. The network interface 63 is communicably connected to other apparatus(es) in the same network through the information LAN 11.

The processing of the above-described HMI client apparatus 16 is realized by a processing circuit. The processing circuit includes the processor 71, the memory 72, a network interface 73, an input interface 74, and the monitor 35 that are connected to one another. The processor 71 realizes the functions of the HMI client apparatus 16 by executing various kinds of programs stored in the memory 72. The memory 72 includes a main storage device and an auxiliary storage device. The network interface 73 is communicably connected to other apparatus(es) in the same network through the information LAN 11. The input interface 74 is a set of input devices including a keyboard, a mouse, a touch panel, and the like.

Although the embodiment of the present invention is described above, the present invention is not limited to the above-described embodiment, and can be variously modified and implemented without departing from the spirit of the present invention. When numerals of the number, the quantity, the amount, the range, and the like of each of the elements are mentioned in the above-described embodiment, the present invention is not limited to the mentioned numerals except for the case of being particularly clearly mentioned and the case of being obviously specified to the numerals in principle. Further, the structure and the like described in the above-described embodiment are not necessarily essential for the present invention except for the case of being particularly clearly mentioned and the case of being obviously specified to the structure and the like in principle.

REFERENCE SIGNS LIST

1 Material to be rolled
2 Heating furnace
3 Roughing mill
4 Intermediate facility
5 Finishing mill
6 Water-cooling apparatus
7 Coiler
8 PLC
9 Control LAN
10 Computer
11 Information LAN
12 HMI server apparatus
13 RM pulpit
14 FM pulpit
15 DC pulpit
16, 16*a*, 16*b*, 16*c* HMI client apparatus
17 Common HMI screen
18, 19, 20 Operation parts
21 PLC signal processing unit
22 Web server processing unit
25 SVG file
26 Parts library
27 Operation authority table
28 Exception table
30, 30*a*, 30*b* Processing circuit
31, 31*a*, 31*b* Web browser processing unit
32, 32*a*, 32*b* Screen drawing processing
35, 35*a*, 35*b* Monitor
36, 36*a*, 36*b* Web browser
37, 37*a*, 37*b* HMI screen
61, 71 Processor
62, 72 Memory
63, 73, 83 Network interface
74 Input interface

The invention claimed is:

1. A Supervisory Control And Data Acquisition (SCADA) web Human Machine Interface (HMI) client apparatus executing at least one web browser communicating with a web server, the SCADA web HMI client apparatus comprising a processor, a memory, and a monitor, wherein the memory stores image data on an HMI screen to supervise an industrial plant, screen operation authority information, and exception information received from the web server, the screen operation authority information defining operation permission/prohibition of the HMI screen for each web browser, the exception information defining operation permission/prohibition of each of specific operation parts on the HMI screen for each web browser, the specific operation parts being part of a plurality of operation parts on the HMI screen, the processor is configured to execute the web browser displayed on the monitor, and the processor is configured to execute screen drawing processing based on a determination of whether each of the specific operation parts is included in the exception information and, upon determining that a specific operation part is included in the exception information, operation permission/prohibition defined in the exception information is preferentially applied to the specific operation part by disregarding operation permission/prohibition defined on the HMI screen, and operation permission/prohibition defined in the screen operation authority information is applied to each of operation part other than the specific operation part among the plurality of operation parts on the HMI screen, and the HMI screen is drawn in the web browser.

2. The SCADA web HMI client apparatus according to claim 1, wherein, in the screen drawing processing, in a case where the web browser is not permitted to operate the HMI screen in the screen operation authority information and where the web browser is permitted to operate the specific operation parts in the exception information, the specific operation parts are drawn in an operable state on the web browser, and operation parts other than the specific operation parts among the plurality of operation parts are drawn in an inoperable state on the web browser.

3. The SCADA web HMI client apparatus according to claim 1, wherein, in the screen drawing processing, in a case where the web browser is permitted to operate the HMI screen in the screen operation authority information and where the web browser is not permitted to operate the specific operation parts in the exception information, the specific operation parts are drawn in an inoperable state on the web browser, and operation parts other than the specific operation parts among the plurality of operation parts are drawn in an operable state on the web browser.

4. The SCADA web HMI client apparatus according to claim 1, wherein exception information defines permissions for different browsers viewing the same screen.

5. A Supervisory Control And Data Acquisition (SCADA) web Human Machine Interface (HMI) system, comprising:

an HMI server apparatus configured to execute a web server;

and an HMI client apparatus configured to execute at least one web browser communicating with the web server, wherein the HMI server apparatus includes a server processor and a server memory, the server memory stores image data on an HMI screen to supervise an industrial plant, screen operation authority information, and exception information, the screen operation authority information defining operation permission/prohibition of the HMI screen for each web browser, the exception information defining operation permission/prohibition of each of specific operation parts on the HMI screen for each web browser, the specific operation parts being a part of a plurality of operation parts on the HMI screen, the server processor is configured to execute the web server, the web server being capable of transmitting the image data, the screen operation authority information, and the exception information to the web browser, the HMI client apparatus includes a client processor, a client memory, and a monitor, the client memory stores the image data, the screen operation authority information, and the exception information received from the web server, the client processor is configured to execute the web browser displayed on the monitor, and the client processor is configured to execute screen drawing processing based on a determination of whether each of the specific operation parts is included in the exception information and, upon determining that a specific operation part is included in the exception information, operation permission/prohibition defined in the exception information is preferentially applied to the specific operation part by disregarding operation permission/prohibition defined on the HMI screen, and operation permission/prohibition defined in the screen operation authority information is applied to each operation part other than the specific operation part among the plurality of operation parts on the HMI screen, and the HMI screen is drawn in the web browser.

6. The SCADA web HMI system according to claim 5, wherein, in the screen drawing processing, in a case where the web browser is not permitted to operate the HMI screen in the screen operation authority information and where the web browser is permitted to operate the specific operation parts in the exception information, the specific operation parts are drawn in an operable state on the web browser, and operation parts other than the specific operation parts among the plurality of operation parts are drawn in an inoperable state on the web browser.

7. The SCADA web HMI system according to claim 5, wherein, in the screen drawing processing, in a case where the web browser is permitted to operate the HMI screen in the screen operation authority information and where the web browser is not permitted to operate the specific operation parts in the exception information, the specific operation parts are drawn in an inoperable state on the web browser, and operation parts other than the specific operation parts among the plurality of operation parts are drawn in an operable state on the web browser.

8. The SCADA web HMI system according to claim 5, wherein exception information defines permissions for different browsers viewing the same screen.

* * * * *